(12) United States Patent  
Phoon et al.

(10) Patent No.: US 8,891,185 B2  
(45) Date of Patent: Nov. 18, 2014

(54) CAMERA MODULE AND METHOD FOR MANUFACTURING SAME

(75) Inventors: Hong Wei Phoon, Bukit Mertajam (MY); Giap Chye Toh, Butterworth (MY); Yeow Thiam Ooi, Butterworth (MY)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 13/211,044

(22) Filed: Aug. 16, 2011

(65) Prior Publication Data

US 2013/0044382 A1 Feb. 21, 2013

(51) Int. Cl.
*G02B 7/02* (2006.01)
*H04N 5/225* (2006.01)

(52) U.S. Cl.
CPC ........... *H04N 5/2253* (2013.01); *H04N 5/2257* (2013.01); *H04N 5/2254* (2013.01)
USPC ............................ 359/824; 359/822; 359/823

(58) Field of Classification Search
USPC ................................................. 359/694–830
See application file for complete search history.

(56) References Cited

U.S. PATENT DOCUMENTS

| 7,619,684 | B2 * | 11/2009 | Nishida et al. ................ 348/374 |
| 2005/0157476 | A1 | 7/2005 | Goudarzi |
| 2009/0195897 | A1 | 8/2009 | Tsai et al. |
| 2010/0033616 | A1 | 2/2010 | Huang et al. |
| 2011/0013789 | A1 | 1/2011 | Chen |
| 2011/0050979 | A1 * | 3/2011 | Rudmann ..................... 348/335 |
| 2011/0121666 | A1 * | 5/2011 | Park et al. ........................ 310/15 |

OTHER PUBLICATIONS

"CO-NETIC® & NETIC® Magnetic Shielding Alloys," Magnetic Shield Corporation, Feb. 2008, Catalog MG-7B, 8 pages.
Magnetic Shield Corporation Catalog LK-4, Feb. 2008, 4 pages.
Kim et al. "A mobile auto-focus actuator based on a rotary VCM with the zero holding current," Optics Express, Mar. 2009, vol. 17, No. 7, 6 pages.
Liu et al. "Miniaturized auto-focusing VCM actuator with zero holding current," Optics Express, Jun. 2009, vol. 17, No. 12, 10 pages.
Extended Search Report for European Patent Application No. 12180498.3, dated Dec. 10, 2012 6 pages.

* cited by examiner

*Primary Examiner* — Mahidere Sahle
(74) *Attorney, Agent, or Firm* — Sheridan Ross P.C.

(57) ABSTRACT

A method for manufacturing camera modules for use in portable electronic devices, such as mobile phones, is provided. More specifically, in camera modules utilizing lens motion type auto focus actuation, permanent magnets associated with voice coil motors utilized in the auto focus system, generate magnetic flux that can interfere with the process of bonding image sensors to camera modules if the permanent magnets of different voice coil motors are positioned too closely. Incorporating a magnetic shield into the manufacturing process to restrain or control the magnetic flux generated by the permanent magnets permits voice coil motors to be positioned closer together during the manufacturing process. This increases manufacturing throughput and reduces cost.

16 Claims, 10 Drawing Sheets

CAMERA MODULE AND METHOD FOR MANUFACTURING SAME

FIELD OF THE INVENTION

The present invention relates to a method of manufacturing an electromagnetically actuated lens driving device used in a camera module of electronic devices such as mobile phones, personal digital assistants and other similar devices.

BACKGROUND OF THE INVENTION

There is growing market demand for handheld and portable electronic devices to include cameras. Mobile phones, personal digital assistants (PDAs), tablets and other portable electronic devices routinely include at least one camera and, in some instances, multiple cameras. There is a consumer demand to increase the presence of cameras in portable electronic devices. Accordingly, there is also a demand to increase the manufacture of camera modules for such devices. Simultaneously, there is incentive to reduce the cost of manufacturing camera modules while improving the yield of the manufacturing process.

In addition, consumer demand requires improved image quality with such cameras. Generally speaking, image quality improves by increasing pixels within image sensors and, with increased pixels, there is a need for an autofocus function associated with the camera module in order to output quality images. Virtually all camera modules used in handheld electronic devices now include an autofocus feature. In general there are two types of auto focusing actuators used in cameras for mobile electronic devices. One is a lens motion type auto focus actuation which utilizes a voice coil motor, piezoelectrics or micro electromechanical system (MEMs) technologies. A second is a lens modification type auto focus actuation which utilizes liquid lens and solid state electro-optical devices. The present invention relates to lens motion type auto focus actuation systems and more specifically those that utilize permanent magnets in connection with the auto focus system such as are used in voice coil motors.

Figure 1:
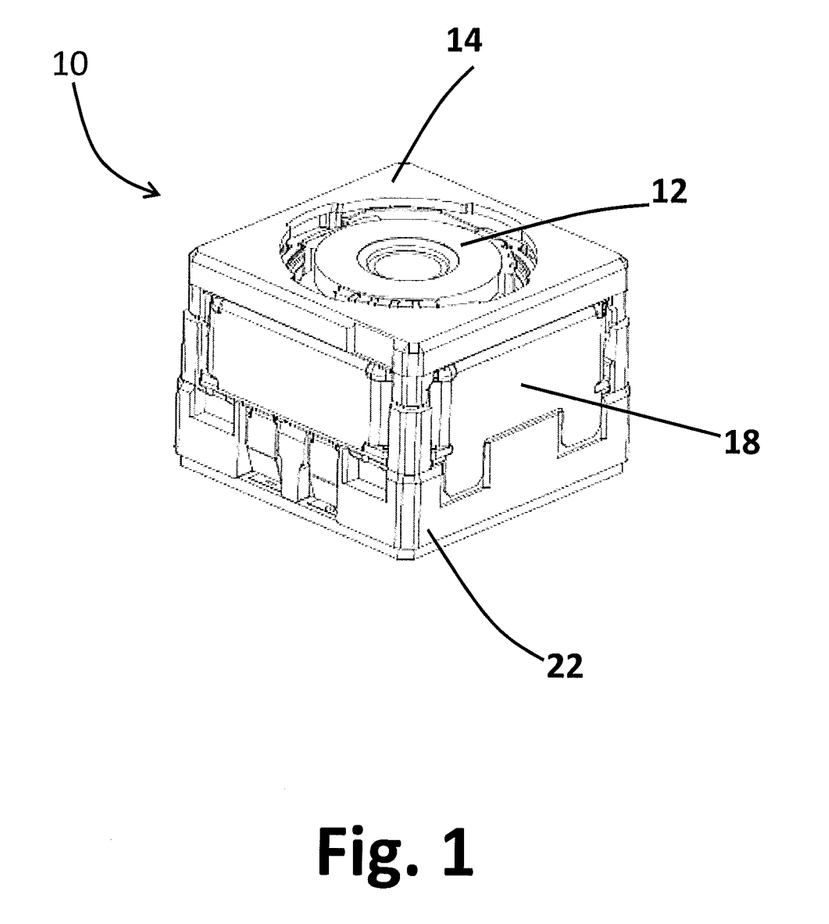
FIG. 1 is a perspective view of a voice coil motor having lens motion auto focus actuation.
Figure 2:
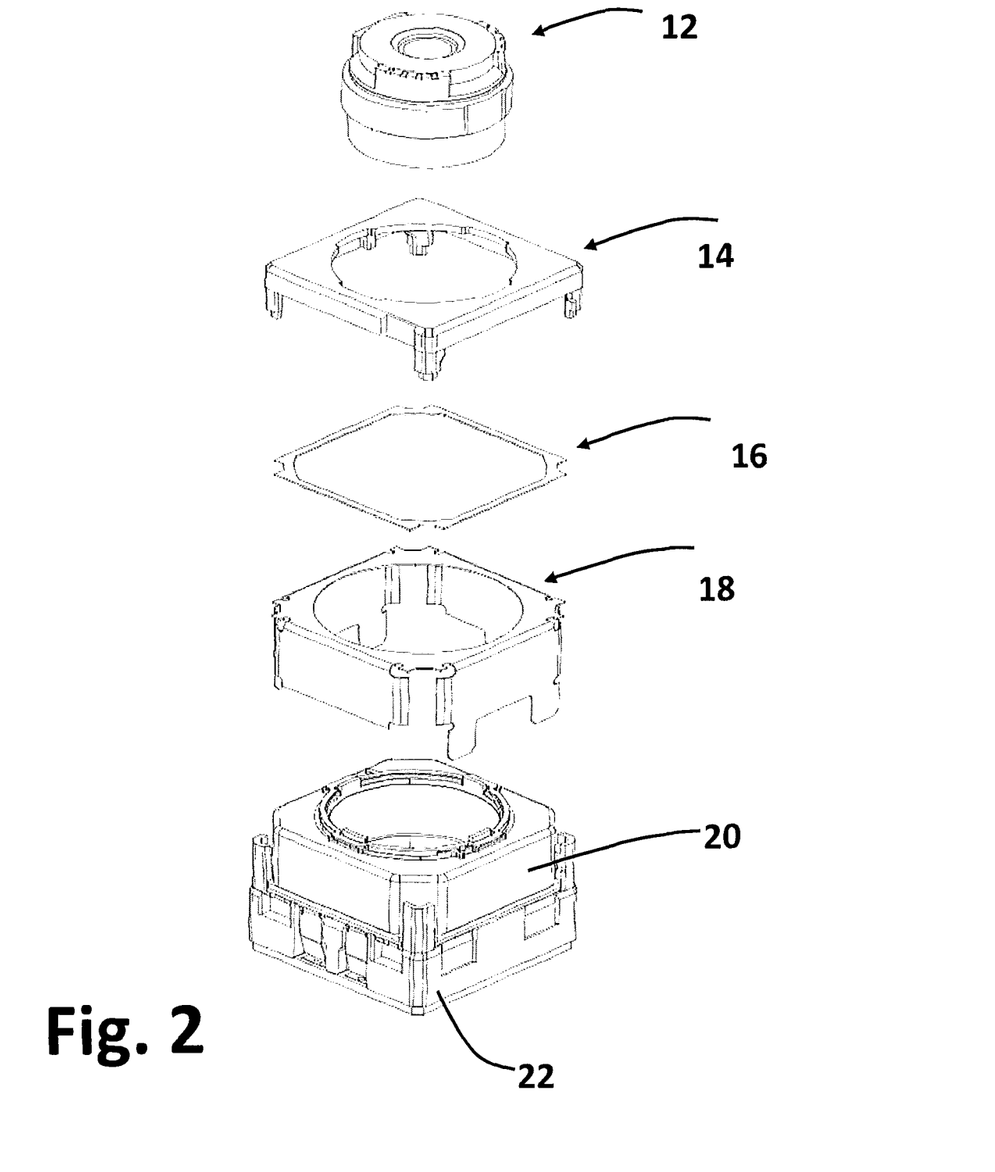
FIG. 2 is an exploded perspective view of a voice coil motor of FIG. 1.

FIG. 1 is a perspective view of a representative example of voice coil motor (VCM) 10 with lens motion type auto focus actuation. FIG. 2 is an exploded view of the VCM 10. In general terms, the VCM 10 includes an axially movable lens 12, a frame member 14, a voice coil motor top spring 16, an electromagnetic interference (EMI) shield 18, a yoke 20 and a base 22. A representative example of a VCM 10 is shown in cross section in FIG. 3. A voice coil motor serves to adjust the position of the lens 12. In general terms, and with respect to adjustment of the lens 12 position, the VCM includes one or more permanent magnets 24 fixed to the yoke 20 and a wire coil 26 associated with the lens housing 28. The coil 26 comprises a number of turns of wire and is positioned radially inwardly from the permanent magnet 24. By driving current through the coil 26, an electromagnetic field is created which interacts with the magnetic field of the permanent magnet 24 to move the lens 12 and drive the lens 12 outwardly or inwardly along its optical axis 30. Changing direction of the current flowing in the coil 26 causes the lens to move in opposite directions. Moving the lens along its optical access 30, towards or away from an image sensor (not shown), focuses a target image on the image sensor. One or more springs 16 are utilized to assist in maintaining the orientation of the lens 12 within the VCM 10 and relative to an image sensor (not shown) and to provide a known resistive or opposing force to the movement imparted by the voice coil motor on the lens 12.

Figure 3:
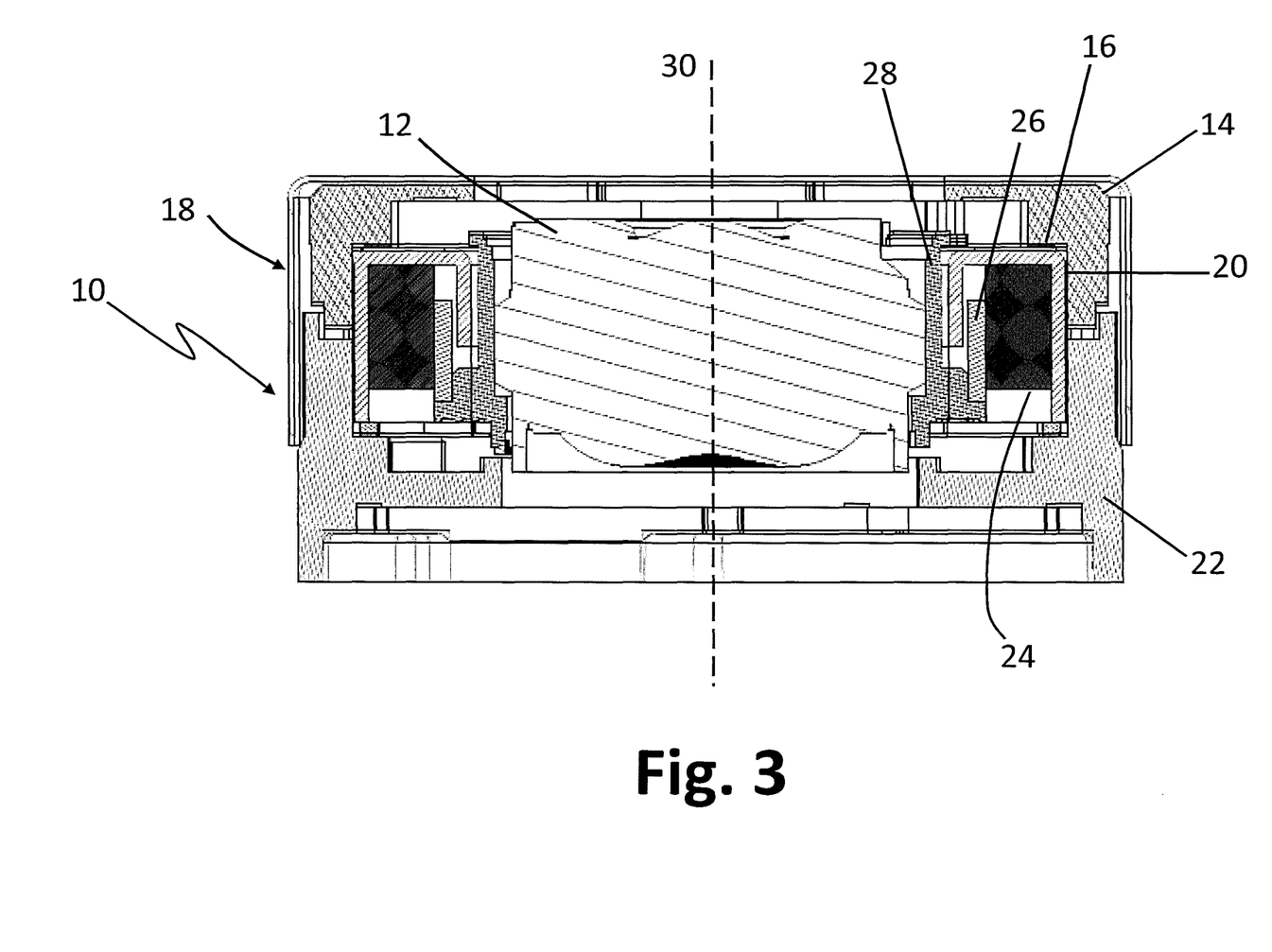
FIG. 3 is a cross-section of the voice coil motor of FIG. 1.

The permanent magnet 24 is generally in the form of a ring or cylinder or may comprise a plurality of arc-shaped magnets which are arranged around the perimeter of the inner wall of the yoke 20. The permanent magnet or magnets generate or create a magnetic flux field that is always present. In contrast, the coil in combination with the yoke also creates a flux field when current flows through the coil. This latter flux field creates what is known as electromagnetic interference (EMI), which may adversely affect nearby or adjacent electrical circuits. The EMI shield 18 is designed to reduce the adverse effects of EMI on surrounding electronics once the VCM is installed in an electronic device and is in operation with current flowing through the coil.

However, during manufacture, the magnetic flux field created by the permanent magnet adversely affects the manufacturing process and, potentially, the acceptable production yield of camera modules containing the VCMs. More specifically, the repelling force or magnetic interference from the permanent magnet(s) inside voice coil motors in adjacent or proximally located voice coil motors or camera assemblies can cause the voice coil motors or camera assemblies to physically shift or move. This is particularly problematic during the manufacturing step of adhering VCMs to image sensors on a printed circuit board or substrate where an adhesive is used to bond these two components to a printed circuit board to create camera modules. Alignment of the VCM relative to the image sensor is a critical step in achieving a camera that outputs acceptable images. If the image sensor and VCM are not properly aligned, the resulting image quality is adversely affected and the camera module formed with the misaligned VCM and image sensor will not pass quality testing and will not be assembled into an electronic device. Thus care must be taken to separate VCMs and associated image sensors a sufficient distance apart from adjacent or proximately positioned VCMs and associated image sensors such that, during the time period before the bonding adhesive fully cures, the repelling force or magnetic interference of nearby permanent magnets does not cause the position of a voice coil motor to shift relative to its associated image sensor. Because of the need for adequate spacing between adjacent or proximate VCMs and associated image sensors, the maximum number of VCMs and associated image sensors that can be processed at one time in any particular manufacturing process is physically limited. Moreover, the existing EMI shields 18 are not designed to resolve this problem, but are designed solely to restrict electromagnetic flux created by the coil and yoke when current is flowing in the coil.

SUMMARY OF THE INVENTION

According to one embodiment of the present invention, a method of manufacturing camera modules is provided comprising providing a plurality of image sensors affixed to a substrate, applying an adhesive to the substrate generally around the perimeter of each image sensor, providing a first voice coil motor and associated movable lens, associating a magnetic shield with the first voice coil motor and lens, positioning the first voice coil motor, lens and associated magnetic shield on the adhesive associated with a first image sensor, providing a second voice coil motor and associated movable lens, associating a second magnetic shield with the second voice coil motor and lens, and positioning the second voice coil motor, lens and associated magnetic shield closely adjacent the first voice coil motor, lens and associated first magnetic shield, wherein the distance separating the first and second voice coil motors is reduced due to the presence of the magnetic shields. As a result, the number of camera modules assembled on the substrate may be increased compared to the number of camera modules that could be assembled on the substrate in the absence of the magnetic shields.

According to a second embodiment of the invention, the magnetic shield associated with each voice coil motor and lens may be reused with a different voice coil motor and lens after the adhesive is cured to bond the first voice coil motor to the first image sensor.

According to another embodiment of the invention, the magnetic shield is associated with a voice coil motor after the voice coil motor is positioned on adhesive associated with an image sensor. Alternatively, the magnetic shield is associated with the voice coil motor before the voice coil motor is positioned on adhesive associated with an image sensor.

In a further embodiment of the invention, the magnetic shield remains associated with the voice coil motor and is included in the final electronic device as part of the camera module.

In a further embodiment of the invention, multiple magnetic shields comprise a single, integral structure.

In yet another embodiment of the invention, the electromagnetic shield of the voice coil motor is eliminated from the voice coil motor assembly and is replaced by the magnetic shield.

As used herein, the term camera module refers to an individual voice coil motor lens and associated image sensor bonded to a printed circuit board or substrate. Multiple voice coil motors and associated lens and image sensors mounted on a single printed circuit board or substrate is referred to as a camera assembly on a printed circuit board.

The Summary of the Invention is neither intended nor should it be construed as being representative of the full extent and scope of the present invention. Moreover, reference made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 4:
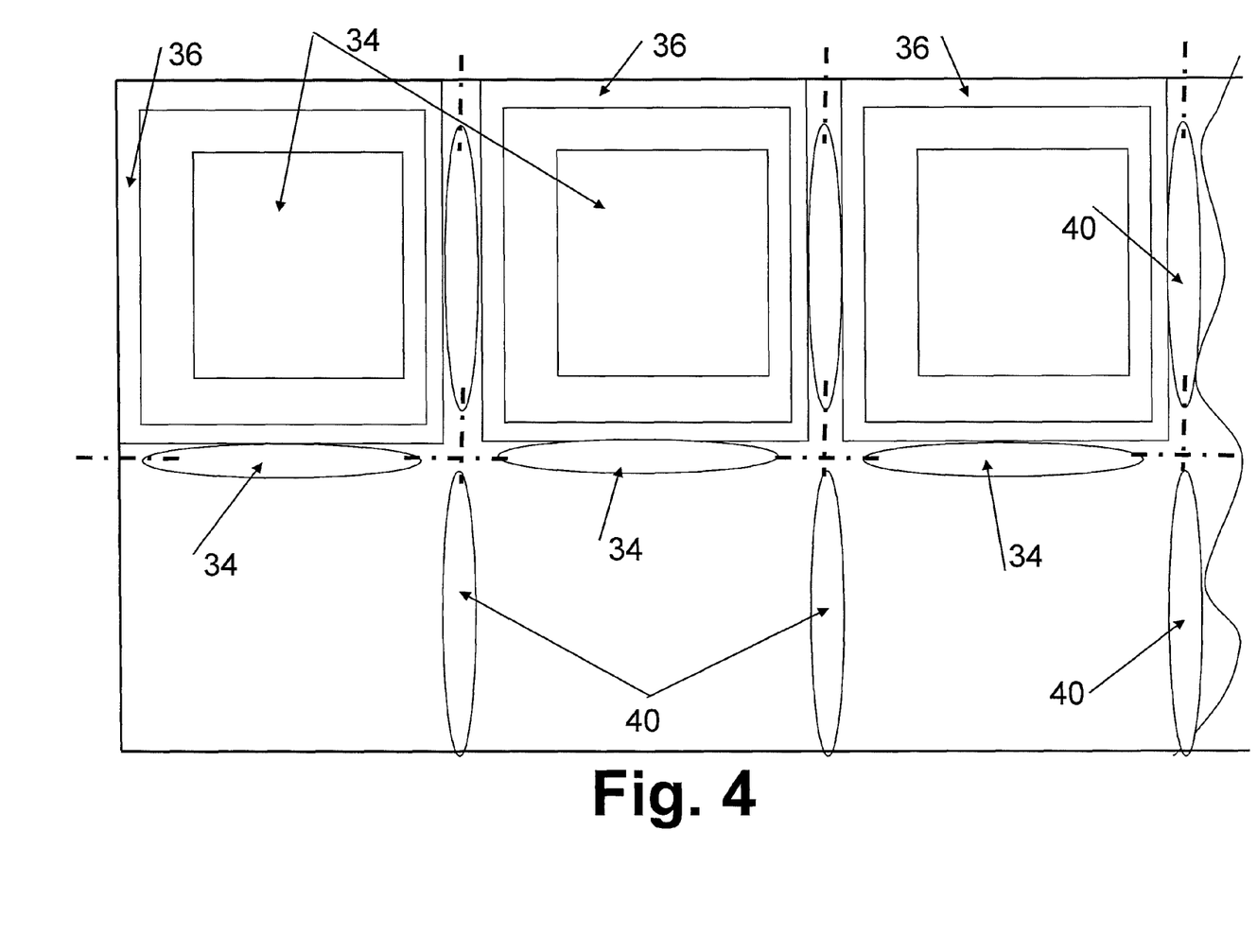
FIG. 4 is a top view of a portion of a printed circuit board, further depicting image sensors and adhesive patterns.

Turning to FIG. 4, a top view of a portion of a printed circuit board or substrate panel 32 is shown. Six discrete areas are also shown for camera assemblies. Three image sensors 34, such as a complementary metal oxide semiconductor (CMOS) or a charge couple device (CCD), are affixed to the substrate 32. As is further shown, an epoxy or other adhesive 36 is positioned around each of the sensors 34.

Figure 5:
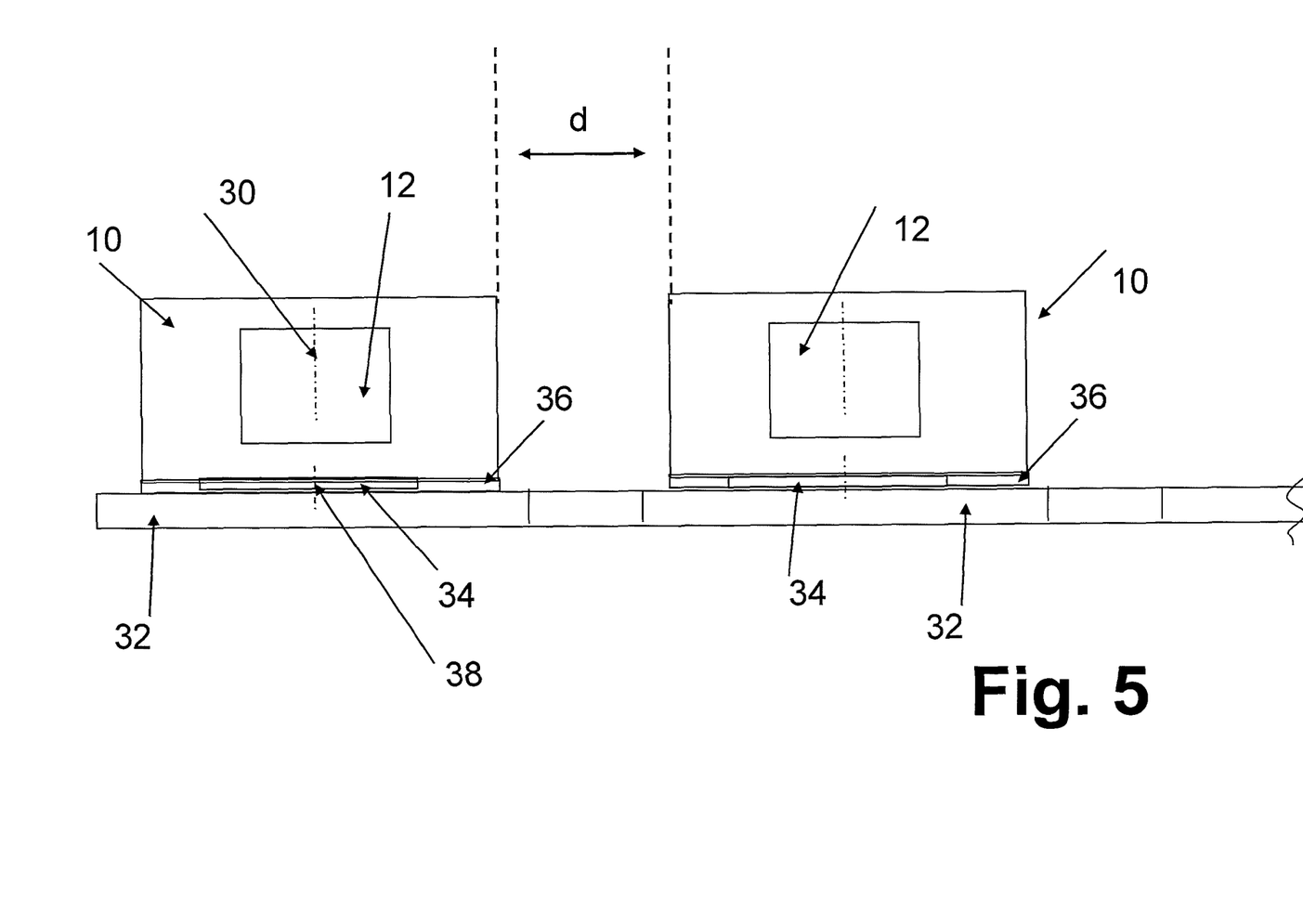
FIG. 5 is a cross-section plan view of a pair of adjacent camera assemblies on a printed circuit board or substrate.

As part of the manufacturing process, voice coil motors 10 are affixed to the substrate 32 by positioning the VCM 10 on the adhesive pattern 36 associated with each individual image sensor 34. This may be accomplished with robotics, such as a pick and place machine, or manually. The entire substrate 32 is then positioned within an oven to cause curing of the adhesive 36 such that the VCM and image sensor are effectively bonded together to form a camera assembly. As part of the positioning and curing steps, and as best illustrated in FIG. 5, it is critical that the optical axis 30 of the lens 12 align with the optical axis 38 of the image sensor 34. If the optical axes 30 and 38 are skewed or not aligned, the finished camera module may not pass quality testing. Positioning of the VCM 10 relative to the image sensor 30 can directly affect the ability of the camera module to provide an appropriately focused image. It is, therefore, an essential step that the relative positioning of the VCM relative to the sensor not change prior to or during the curing period.

Following curing the adhesive, the camera assemblies are separated or singulated resulting in individual camera modules. Apertures or holes 40 are formed in the substrate panel 32 and define each of the discrete areas. The apertures 40 assist in singulating the camera assemblies 10 from each other for subsequent testing and assembly into a finished electronic device.

Figure 6:
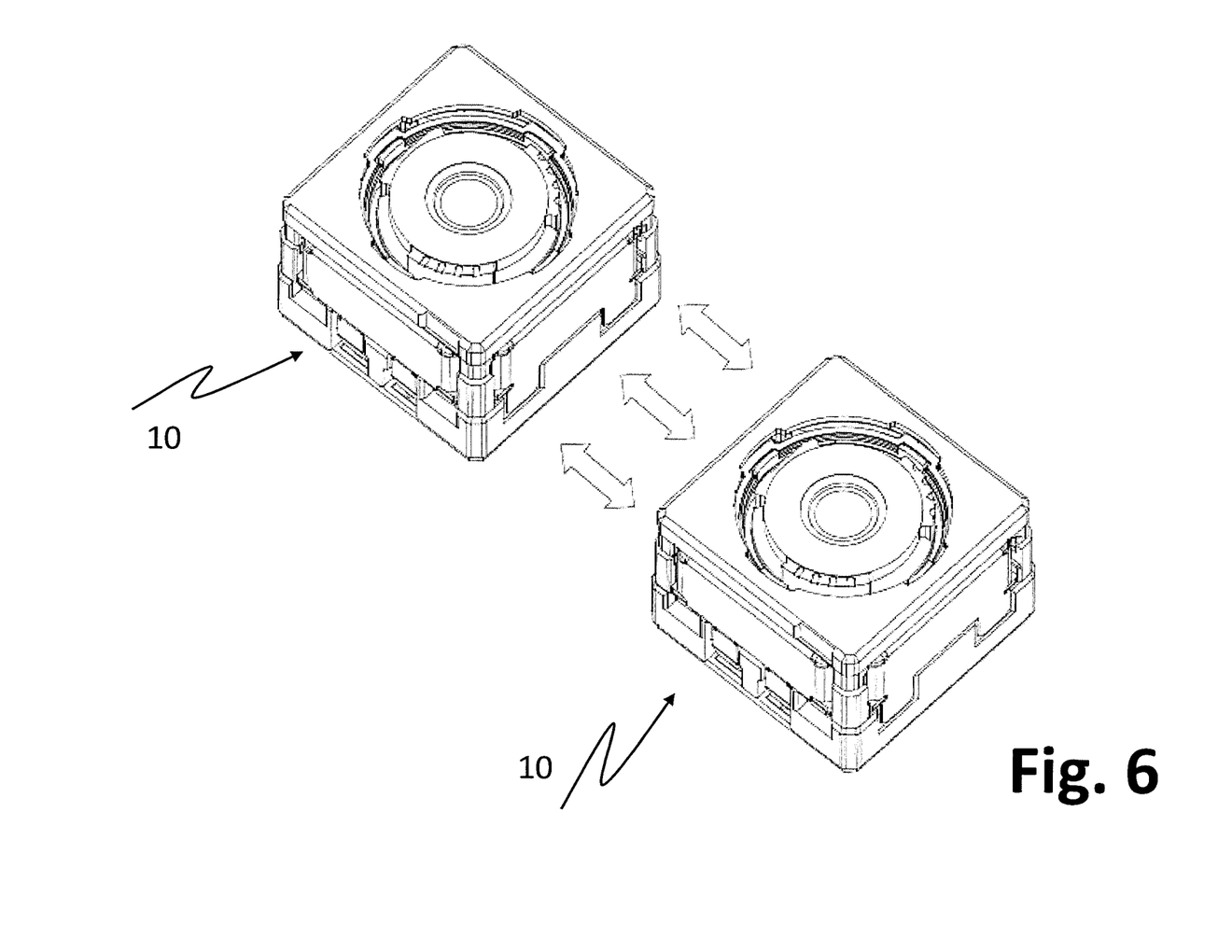
FIG. 6 is a perspective view of the repelling force generated by permanent magnets of two adjacent voice coil motors.
Figure 7:
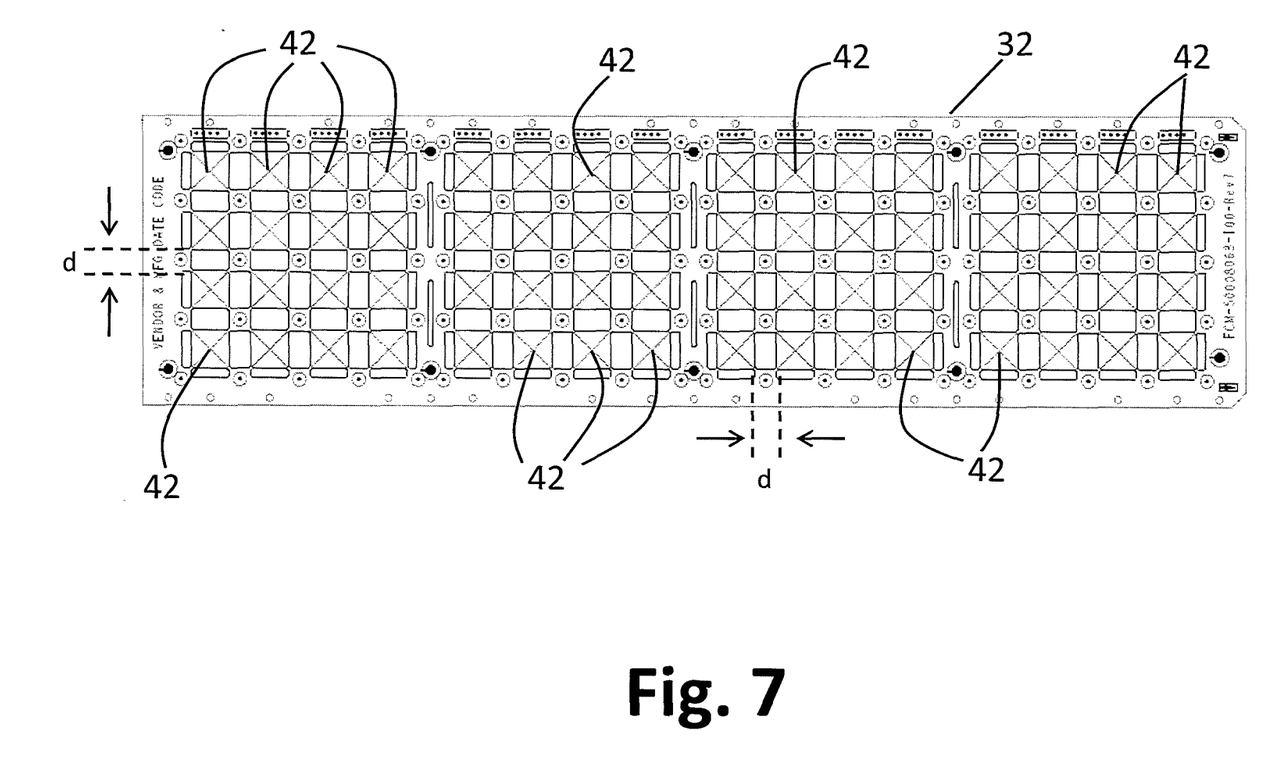
FIG. 7 is a top plan view schematic of a layout of camera assemblies on a printed circuit board or substrate for adhesive curing.
Figure 8:
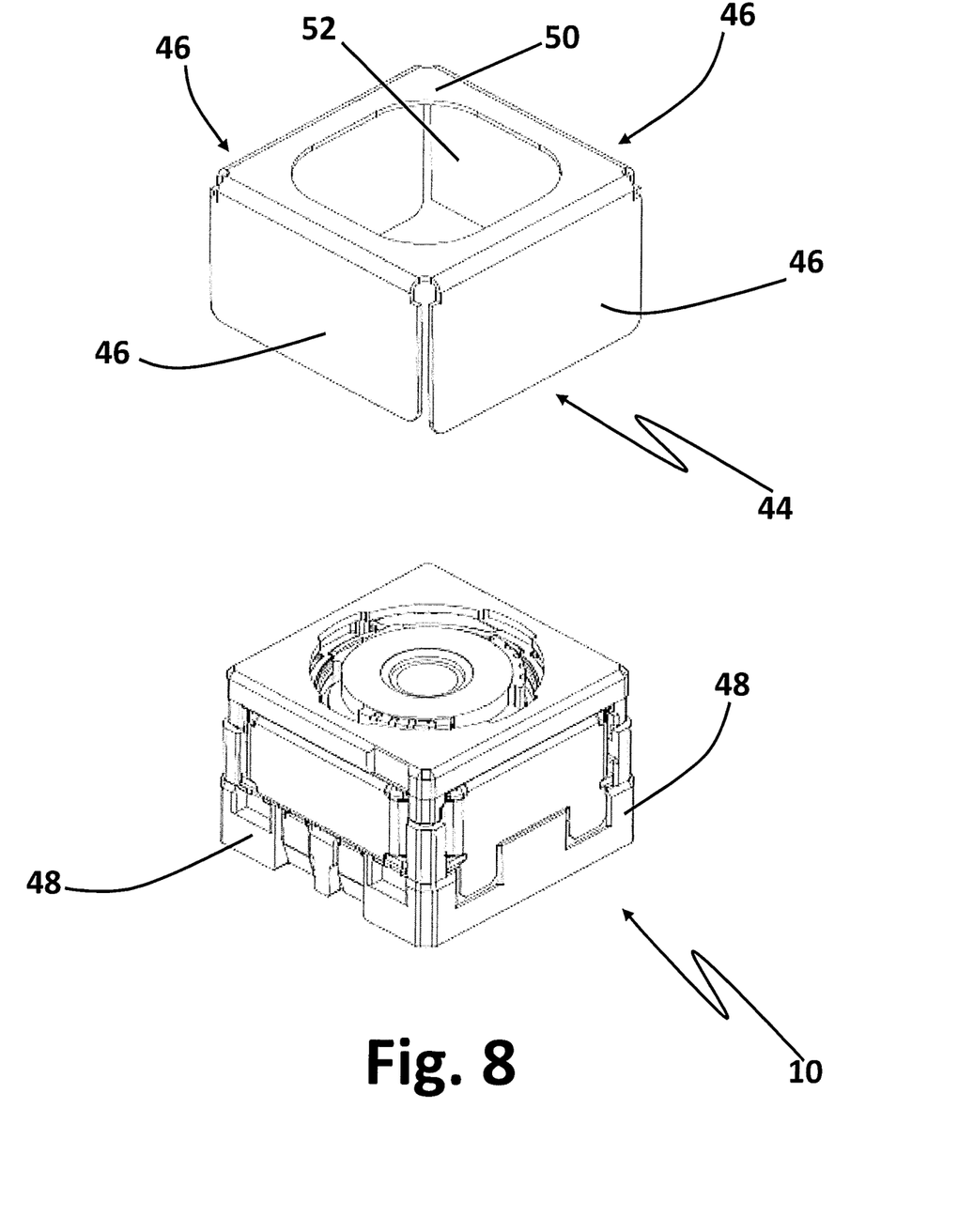
FIG. 8 is an exploded view of a voice coil motor and magnetic shield cap.

During the curing process, it is possible that the permanent magnets 24 within each VCM interact with the permanent magnets 24 in adjacent VCMs due to their proximity on the substrate 32. This is diagrammatically represented in FIG. 6 showing the repelling force between two adjacent VCMs 10. Because of the repelling force or magnetic interference, it is possible for permanent magnets in adjacent VCMs to interact and cause physical movement of one or more lenses 12 relative to the associated image sensor 34 before the adhesive 36 is cured. As a result, it is possible that the optical axis 30 of the lens 12 and the optical axis 38 of the image sensor 34 become skewed or misaligned, thereby adversely degrading the image quality of the resulting camera module. To avoid this type of adverse interaction and to avoid a reduction or loss in manufacturing yield, the individual image sensors 34 are positioned a safe distance apart on the printed circuit board 32 to reduce this adverse interaction between VCMs when the VCMs are positioned on the printed circuit board. A representative example of a printed circuit board having 64 discrete locations 42 for adhering image sensors 34 relative to VCMs 10 to create camera assemblies is shown in FIG. 7. As illustrated, the substrate 32 includes four 4×4 arrays of camera assemblies 10. In this embodiment, the substrate 32 is approximately 62 millimeters by 237 millimeters, and the individual VCMs 10 are typically 8.5 millimeters by 8.5 millimeters. As shown in FIGS. 5 and 7, the VCMs are separated by a distance "d." To avoid or substantially reduce the repelling action of the permanent magnets in adjacent VCMs, the distance "d" in the array shown in FIG. 7 is approximately 4.5 millimeters. With this orientation and layout, the VCMs 10 cover approximately 32% of the surface area of the printed circuit board 32, and 64 camera assemblies may be cured simultaneously on the single substrate 32 without magnetic interference causing undesired movement of adjacent VCMs. According to the present invention, the repelling force of the permanent magnets 22 can be substantially constrained or controlled by adding a magnetic shield cap 44 to each VCM 10. An illustration of such a magnetic shield is shown in FIG. 8. The magnetic shield cap 44 is positioned over the camera module prior to the VCM being positioned on the adhesive pattern 36 laid out on the substrate 32. The magnetic shield cap 44 constrains and controls the flux generated by the permanent magnet. As shown, the shield comprises four side wall panels 46 that generally match the size of the side walls 48 of the VCM. The upper panel 50 is shown with an opening 52 such that it does not interfere with the optical functioning of the lens 12. An example of material used for the magnetic shield cap 44 is a Co-Netic® foil product, Model AA6F006-4, made by Magnetic Shield Corporation of Bensenville, Ill., having a thickness of 0.15 millimeters. Foil ranging in thickness from approximately 0.05 millimeters to 0.25 millimeters can provide effective shielding with minimum tooling costs. As should be appreciated, many alternative versions of this material will work, with thicker shielding providing a higher shielding effect.

Set forth below in Table 1 is a comparison of repelling distance in millimeters of two adjacent VCMs of the same construction. Fifteen tests were performed involving 30 VCMs of the same construction. In the first test, the repelling distance was determined without a magnetic shield cap 44 in place. In the second test, the repelling distance was determined with a magnetic shield cap 44 in place. For purposes of this test, the foregoing identified Co-Netic Foil AA6F006-4 having a thickness of 0.15 millimeters.

TABLE 1

| | Repel Distance (mm) | |
|---|---|---|
| | W/O Magnetic-Shield Cap | W/Magnetic-Shield Cap |
| 1 | 4.8213 | 0.1198 |
| 2 | 5.7235 | 0.1403 |
| 3 | 5.4433 | 0.1252 |
| 4 | 4.8012 | 0.1353 |
| 5 | 4.2124 | 0.1461 |
| 6 | 5.4456 | 0.1551 |
| 7 | 4.5100 | 0.1538 |
| 8 | 5.3185 | 0.2207 |
| 9 | 5.1448 | 0.1589 |
| 10 | 5.1197 | 0.1641 |
| 11 | 4.5456 | 0.1609 |
| 12 | 5.6894 | 0.1490 |
| 13 | 4.3446 | 0.1253 |
| 14 | 4.4460 | 0.1461 |
| 15 | 5.2325 | 0.1765 |

TABLE 1-continued

| | Repel Distance (mm) | |
|---|---|---|
| | W/O Magnetic-Shield Cap | W/Magnetic-Shield Cap |
| Max | 5.7235 | 0.2207 |
| Min | 4.2124 | 0.1198 |
| Average | 4.9866 | 0.1518 |
| | Total QTY (units) | 30 |

Figure 9:
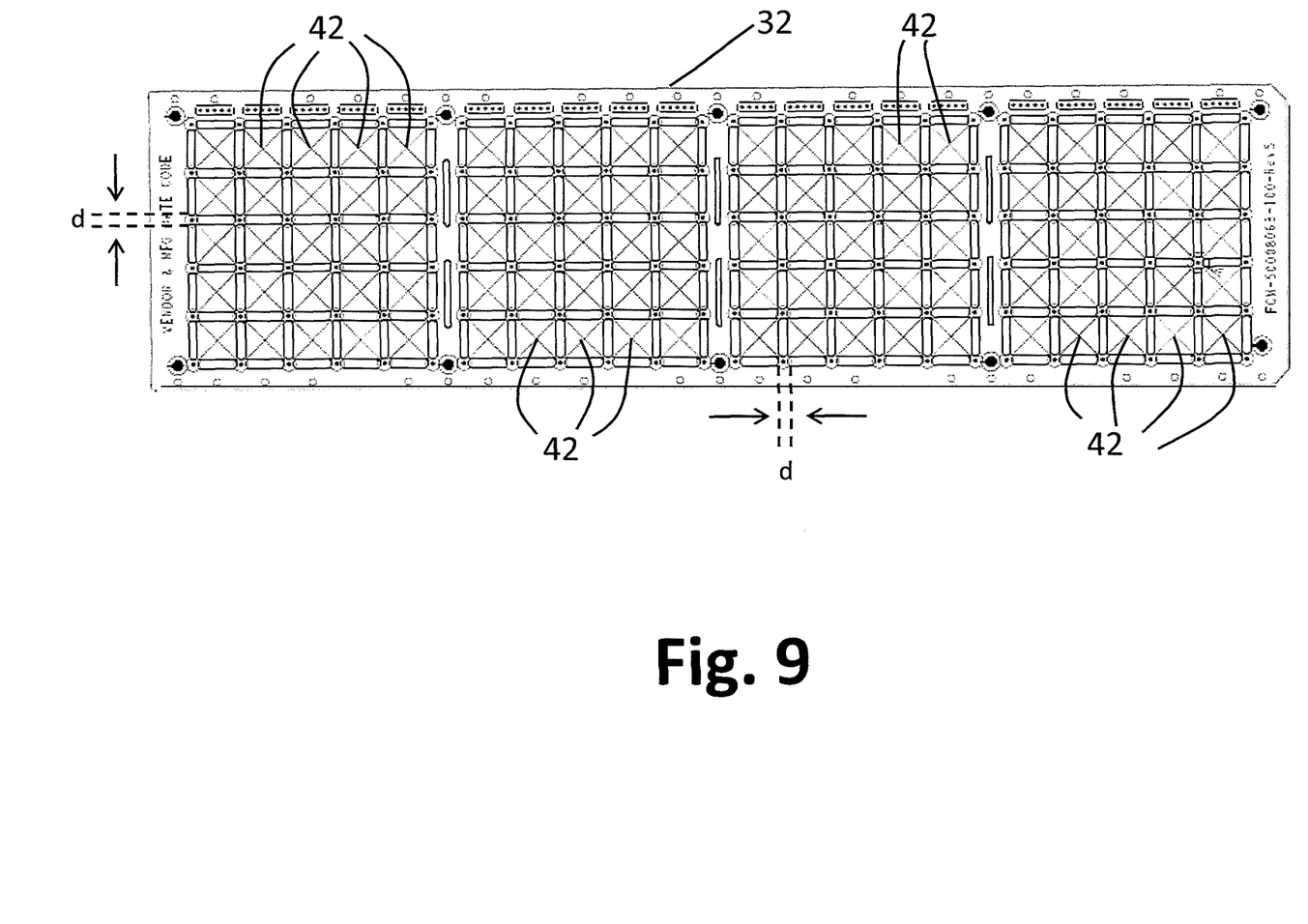
FIG. 9 is a top plan view of schematic layout of camera assemblies on a printed circuit board or substrate and including a magnetic shield cap, and showing a more compact arrangement of the camera assemblies for adhesive curing.

As can be seen, without a magnetic shield cap 44 in place, the average repelling distance was slightly under 5 millimeters, specifically 4.9866 millimeters. In comparison, with a magnetic shield cap 44 in place, the average repelling distance was reduced by a factor of 33 to 0.1518 millimeters. The resulting effect is that by using magnetic shield caps during the adhesive curing stage of the manufacturing process, adjacent VCMs 10 may be positioned closer together to increase the through-put of the manufacturing process and reduce costs without sacrificing quality or yield. As shown in FIG. 9, using a magnetic shield, the same substrate 32 as depicted in FIG. 7 may comfortably hold 100 VCMs 10 during the curing process with the distance "d" separating the VCM camera assemblies approximately 1.75 millimeters. As a result, the number of camera assemblies increases by more than 50% using a substrate of the same size. The data in Table 1 shows that the VCMs 10 may be positioned even closer together utilizing a magnetic shield cap. However, the limiting factor is the ability for other tooling to cut the substrate and singulate the individual camera modules from each other. Smaller or more precise tooling may allow even more camera assemblies to be utilized within the same area.

Figure 10:
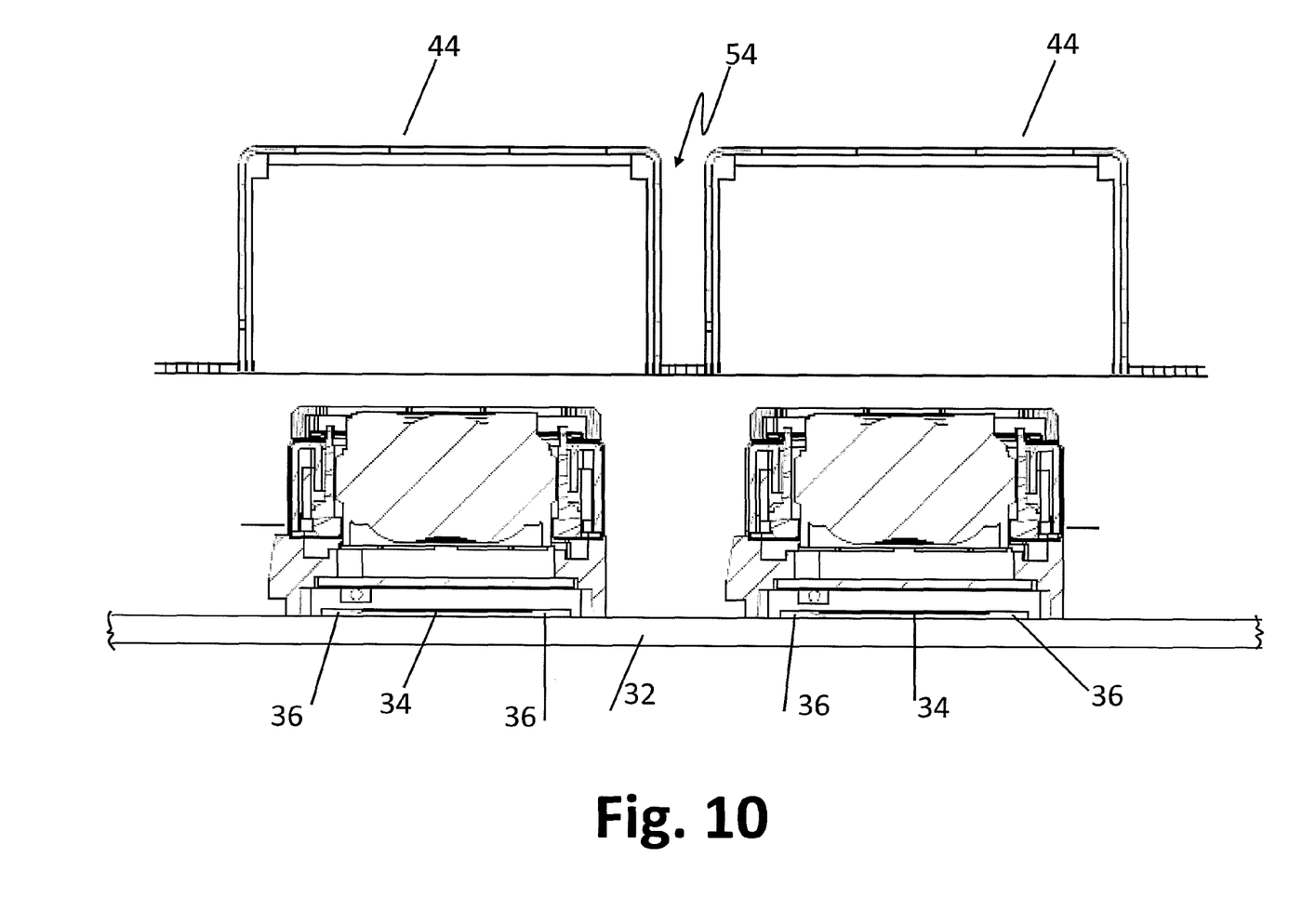
FIG. 10 is a cross sectional view of a single magnetic shield cap used with multiple voice coil motors.

In one embodiment the magnetic shield caps 44 are removed from the camera assemblies 10 following curing of the adhesive, either prior to or following singulation. The removed magnetic cap shields may then be reused during the curing process of a subsequent batch of VCMs, thereby achieving further savings from re-use of the magnetic shield caps. Alternatively, it should be appreciated that the magnetic cap shields may remain in place and be included into the final electronic device. In such circumstances, the electromagnetic interference shield 18 may be completely removed from the VCM assembly and replaced by the magnetic shield cap 44. The magnetic shield cap 44 will control both the magnetic flux generated by the permanent magnets during the manufacturing process and also the EMI shielding needed to control the magnetic flux generated by the electromagnetics sufficient to meet applicable standards. In another embodiment, illustrated in FIG. 10, multiple magnetic shield caps may be formed in a single integral piece 54. Such a structure may reduce the manufacturing through put time and increase efficiencies in the manufacturing process.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

Other modifications or uses for the present invention will also occur to those of skill in the art after reading the present disclosure. Such modifications or uses are deemed to be within the scope of the present invention.

What is claimed is:

1. A method of manufacturing camera modules, each comprising a voice coil module, a lens and an image sensor, the method comprising:

providing a first voice coil module and a second voice coil module, wherein each of the first and second voice coil modules comprises a yoke, including a permanent magnet, an electromagnet, a frame, and a lens, the lens movable within the frame and the yoke under the influence of the permanent magnet and the electromagnet;

providing a substrate with a plurality individual of image sensors affixed to the substrate, each image sensor having a perimeter;

applying an adhesive to the substrate proximate to the perimeter of the image sensors;

positioning the first voice coil module to adhere to the substrate proximate to the perimeter of a first image sensor;

associating a first magnetic shield with the first voice coil module to reduce the magnetic flux exiting the first voice coil module;

positioning a second voice coil module to adhere to the substrate proximate to the perimeter of a second image sensor, the first and second image sensors being adjacent to each other on the substrate;

associating a second magnetic shield with the second voice coil module to reduce the magnetic flux exiting the second voice coil module;

wherein the first and second magnetic shields prevent interaction between the permanent magnets in the first and second voice coil modules; and wherein, the distance between the first and second voice coil modules on the substrate may be reduced due to the presence of the first and second magnetic shields and the total number of voice coil modules positioned on a substrate is increased.

2. The method of claim 1, wherein associating a first magnetic shield with a first voice coil module comprises positioning the first magnetic shield relative to the first voice coil module before the first voice coil module is positioned on the adhesive associated with the first image sensor.

3. The method of claim 2, wherein associating a second magnetic shield with a second voice coil module comprises positioning the second magnetic shield relative to the second voice coil module before the second voice coil module is positioned on the adhesive associated with the second image sensor.

4. The method of claim 1, wherein positioning the first and second voice coil modules on the adhesive associated with the first and second image sensors comprises aligning the optical axis of a lens associated with the first voice coil module with the optical axis of the first image sensor, and aligning the optical axis of a lens associated with the second voice coil module with the optical axis of the second image sensor.

5. The method of claim 1, further comprising, curing the adhesive.

6. The method of claim 5, further comprising, singulating the first voice coil module, first image sensor and associated substrate from the remaining substrate, and subjecting the first voice coil module and first image sensor to testing.

7. The method of claim 6, further comprising assembling the first voice coil module and first image sensor in an electronic device comprising a camera.

8. The method of claim 7, further comprising removing the first magnetic shield prior to assembling the first voice coil module and first image sensor in an electronic device.

9. The method of claim 8, further comprising reusing the first magnetic shield with a different voice coil module in a subsequent manufacturing process.

10. The method of claim 1, wherein the first and second magnetic shields comprises foil having a thickness between approximately 0.05 and 0.25 millimeters.

11. The method of claim 1, wherein distance separating the first voice coil module and the second voice coil module is between approximately 1.0 and 4.0 millimeters.

12. The method of claim 1, wherein the first and second magnetic shields comprise separate structures.

13. The method of claim 1, further comprising increasing the number of voice coil module and image sensor subcombinations per unit area of substrate between approximately one and fifty percent.

14. In combination:
a first voice coil module and a second voice coil module each comprising a yoke, including a permanent magnet, an electromagnet, a frame and a spring;
a substrate with a first image sensor affixed to the substrate proximate to a second image sensor, each image sensor having a perimeter
an adhesive applied to the substrate proximate to the perimeter of the image sensors;
a first lens, movable within a first frame and first yoke under the influence of a first permanent magnet and electromagnet;
a second lens, movable within a second frame and second yoke under the influence of a second permanent magnet and second electromagnet;
a first magnetic shield positioned exterior of said first permanent magnet to restrict the magnetic field generated by the first permanent magnet outside of the first magnetic shield;
a second magnetic shield positioned exterior of said second permanent magnet to restrict the magnetic field generated by the second permanent magnet outside of the second magnetic shield; and,
the first voice coil module and the second voice coil module are adhered to the substrate and the optical axis of the first lens and the second lens are aligned with the optical axis of the first and second image sensors, respectively.

15. The combination of claim 14, wherein the distance separating the first and second voice coil modules is between approximately 0.20 and 4.0 millimeters.

16. The combination of claim 15, wherein the distance separating the first and second voice coil modules is approximately 1.75 millimeters.

* * * * *

UNITED STATES PATENT AND TRADEMARK OFFICE
CERTIFICATE OF CORRECTION

PATENT NO. : 8,891,185 B2
APPLICATION NO. : 13/211044
DATED : November 18, 2014
INVENTOR(S) : Phoon et al.

It is certified that error appears in the above-identified patent and that said Letters Patent is hereby corrected as shown below:

In the Claim

Claim 14, column 8, lines 27-28, replace "each image sensor having a perimeter" with --each of the first and second image sensors having a perimeter;--.

Claim 14, column 8, line 30, replace "of the image sensors" with --of the first and second image sensors--.

Claim 14, column 8, line 33, before "electromagnet" insert --first--.

Signed and Sealed this
Thirty-first Day of March, 2015

Michelle K. Lee
*Director of the United States Patent and Trademark Office*